United States Patent [19]

Soma

[11] Patent Number: 5,327,162
[45] Date of Patent: Jul. 5, 1994

[54] X-Y DIRECTION INPUT DEVICE

[75] Inventor: Masahiro Soma, Furukawa, Japan

[73] Assignee: Alps Electric Co., Ltd., Tokyo, Japan

[21] Appl. No.: 28,518

[22] Filed: Mar. 9, 1993

[30] Foreign Application Priority Data

Mar. 17, 1992 [JP] Japan .............................. 4-014205[U]
Mar. 17, 1992 [JP] Japan .............................. 4-014206[U]
Mar. 17, 1992 [JP] Japan .............................. 4-014207[U]
May 18, 1992 [JP] Japan .................................. 4-124918

[51] Int. Cl.⁵ ........................................... G09G 3/02
[52] U.S. Cl. ..................................... 345/161; 345/156
[58] Field of Search .............................. 340/709, 706;
250/237 G; 200/6 A; 345/156, 161

[56] References Cited

U.S. PATENT DOCUMENTS

| | | | |
|---|---|---|---|
| 4,439,672 | 3/1984 | Salama | 250/237 G |
| 4,670,743 | 6/1987 | Zembe | 340/709 |
| 4,782,327 | 11/1988 | Kley | 340/709 |
| 5,019,677 | 5/1991 | Menen | 340/709 |
| 5,086,296 | 2/1992 | Clark | 340/709 |

Primary Examiner—Alvin E. Oberley
Assistant Examiner—Minsun Oh
Attorney, Agent, or Firm—Guy W. Shoup; Patrick T. Bever

[57] ABSTRACT

The present invention relates to a thin x-y direction input device for moving a cursor on a screen in any direction. The x-y direction input device includes a casing having an opening and an operating member that is resting on the casing and capable of sliding. A cursor appearing on a display moves in any direction according to movement of the operating member. The operating member includes a flat plate sliding over a receiver surface lying in the casing, and a projection that projects from the flat plate and engages with first and second moving members having either detecting elements or elements to be detected, and the projection is exposed from the aperture. This enables smooth movement of the moving members. The operating member is provided with elastic tongues pushing back the first and second moving members from their ends of movement to the center.

12 Claims, 8 Drawing Sheets

FIG. 2
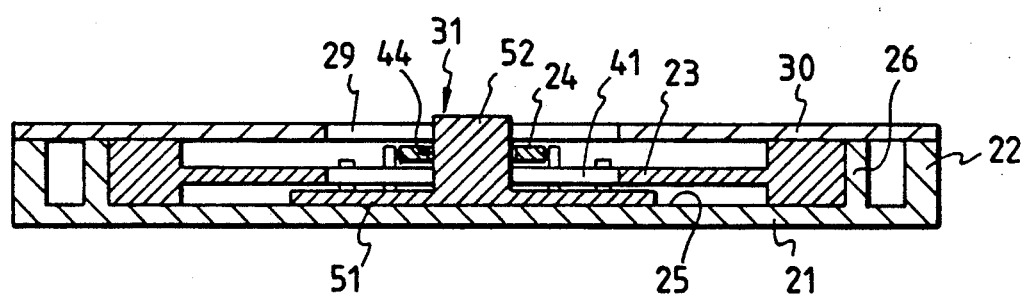
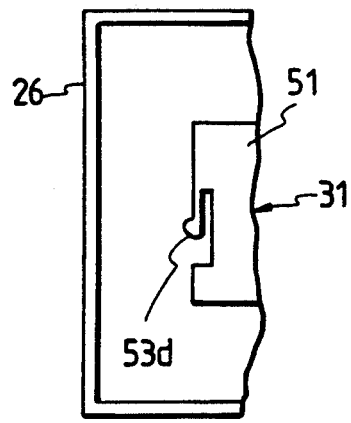
FIG. 3(a)
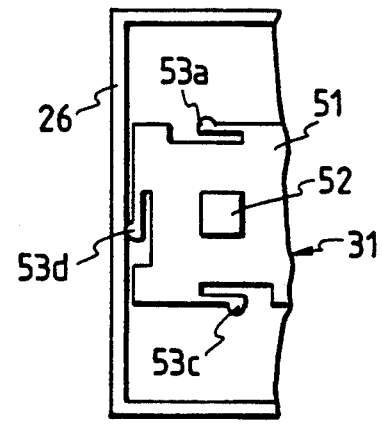
FIG. 3(b)
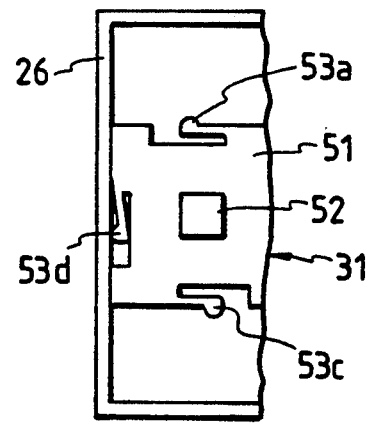
FIG. 3(c)

X-Y DIRECTION INPUT DEVICE

BACKGROUND OF THE INVENTION

1. Field of the Invention

The present invention relates to an x-y direction input device for moving a cursor on a screen in any direction.

2. Description of the Prior Art

An x-y direction input device for moving a cursor appearing on a display in any direction according to a magnitude of movement of an operating member has been proposed in the past.

FIG. 12 is a plan view showing an example of this kind of conventional x-y direction input device. FIG. 13 is an a cross-sectional view of the x-y direction input device taken along line 13—13 shown in FIG. 12.

A conventional x-y direction input device comprises, as shown in FIG. 12, a casing 1 having an aperture which is not shown, an operating member 2 resting on the casing 1 and movable relatively, an x-direction pattern 3 and a y-direction pattern 4 lying in the casing 1, a first moving member 6 holding a slider 5 which comes into contact with and slides along the x-direction pattern, a first guide means 7 guiding the moving member 6 in the x direction, a second moving member 9 holding a slider 8 which comes into contact with and slides along the y-direction pattern 4, and a second guide means 10 guiding the moving member 9 in the y direction. The operating member 2 comprises, as shown in FIG. 13, an axis 12 projecting upward from the aperture of the casing 1, a washer 13 fitted to the axis 12, and a knob 14 attached to the top end of the axis 12. The first moving member 6 has an elongated hole 6a that is elongated in the y direction and in which the axis 12 is inserted. The second moving member 9 is stacked on the moving member 6. The second moving member 9 also has an elongated hole 9a that is elongated in the x direction and in which the axis is inserted.

When the above conventional x-y direction input device is assembled, the axis 12 is inserted in the elongated holes 6a and 9a from under the first moving member 6, and then the washer 13 is fitted to the axis 12 in order to prevent the axis 12 from coming off. Thereafter, the knob 14 is attached to the top end of the axis 12. When the knob 14 is manually displaced in the x-y plane, the first moving member 6 and second moving member 9 are respectively moved in the x and y directions. The sliders 5 and 8 held by the moving members 6 and 9 detect the patterns 3 and 4 respectively. Thereby, a magnitude of movement of the knob 14 is detected. Thus, a cursor appearing on a display is moved to any position according to the magnitude of movement of the knob 14.

In the foregoing conventional x-y direction input device, when the knob 14 is manipulated, axial pressing force is applied to the axis 12. Therefore, the second moving member 9 is pressed down via the washer 13. This causes friction between the second moving member 9 and the first moving member 6 underlying the moving member 9. Consequently, these moving members 6 and 9 cannot move smoothly. Thus, the operability deteriorates.

SUMMARY OF THE INVENTION

The present invention attempts to solve the aforesaid problems of a prior art. An object of the present invention is to provide an x-y direction input device not only capable of moving a cursor appearing on a display in any direction according to a magnitude of movement of an operating member without requiring, unlike a mouse, a ball or a rotary encoder but also capable of smoothly moving a pair of moving members provided with detecting means or means to be detected.

To achieve the above object, the present invention provides an x-y direction input device that includes a casing having an aperture, and an operating member resting on the casing and movable relative to the casing. Manipulation of the operating member generates signals which are used to move a cursor appearing on a display in any direction according to a magnitude of movement of the operating member. The input device includes: pair of means to be detected having an x-direction pattern and an y-direction pattern respectively; a plurality of detecting means opposed to the means to be detected; a substrate having either of the means to be detected and the detecting means; first and second moving members having the other ones of the means to be detected and detecting means; a first guide means guiding the first moving member in the x direction; and a second guide means guiding the second moving member in the y direction. The operating member comprises a flat plate sliding over a receiver surface lying in the casing, and a projection that is projecting from the flat plate and engaging with the first and second moving members, and one of whose ends is exposed from the aperture.

Another object of the present invention is to provide an x-y direction input device enabling control of movement or stop of a cursor with excellent operability even after an operating member reaches an end of movement.

To achieve the above object, the present invention comprises an end detecting means detecting that first and second moving members have reached their ends of movement and enabling generation of a false pulse signal, an elastic member for pushing back these first and second moving members from their ends of movement to the center. The elastic members are formed as part of the operating member.

In the present invention having the foregoing construction, when the projection exposed from the aperture of the casing is pressed in, for example, the x direction, the first moving member engaging with the projection is driven, and moved in the x direction while being guided by the first guide means. At this time, since the first moving member moves relatively in the x direction with respect to the substrate, the detecting means lying in either one of the first moving member and substrate detects the means to be detected lying in the other one of the first moving member and substrate and having the x-direction pattern. Thereby, the x-direction movement of the projection is detected. According to the magnitude of movement of the projection, the cursor appearing in a display moves to any position in the x direction. In this case, the axial pressing force applied to the projection resulting from the pressing operation of the projection is received by the receiver surface of the casing via the flat plate. Therefore, the axial pressing force will not be applied to the first or second moving member. This is true for an operation of pressing the projection in the y direction or for an operation of pressing the projection in the x and y directions simultaneously. Therefore, a ball or rotary encoder is not required unlike a mouse. Moreover, not only can a cursor appearing on a display be moved in any direction according to movement of an operating member, but also a pair of moving bodies holding detecting means or means to be detected can be moved smoothly. Furthermore, since the flat plate has multiple pairs of slide-contact members sliding along both side faces of the first moving member and both side frames of the second moving member, the middle sections of the moving members are guided by the slide-contact members. Consequently the moving members can be moved smoothly.

When the end detecting member detecting that the first and second moving members have reached their ends of movement, and the elastic members for pushing back these first and second moving members from the ends of movement to the center are included, if the operating member is operated to an end of movement in the x direction, the end detecting member detects the fact that the first moving member has reached an end of movement. Then, a false pulse signal is supplied, and the x-direction movement of a cursor is continued. Next, when the operating member is released, the elastic members push back the first moving member from the end of movement to the center, and then the cursor stops moving. This is also true for an operation of moving the operating member in the y direction or an operation of moving the operating member in the x and y directions simultaneously. Thereby, even after the operating member has reached an end of movement, the movement of the cursor can be controlled.

BRIEF DESCRIPTION OF THE DRAWINGS

FIG. 2 is a cross-sectional view of a major portion for explaining a structure of an operating member included in the x-y direction input device of FIG. 1;

FIGS. 3(a), 3(b) and 3(c) are partial plan views showing the operations of elastic members included in the x-y direction input device of FIG. 1;

DESCRIPTION OF THE PREFERRED EMBODIMENTS

Embodiments of an x-y direction input device of the present invention will be described in conjunction with the drawings.

Figure 1:
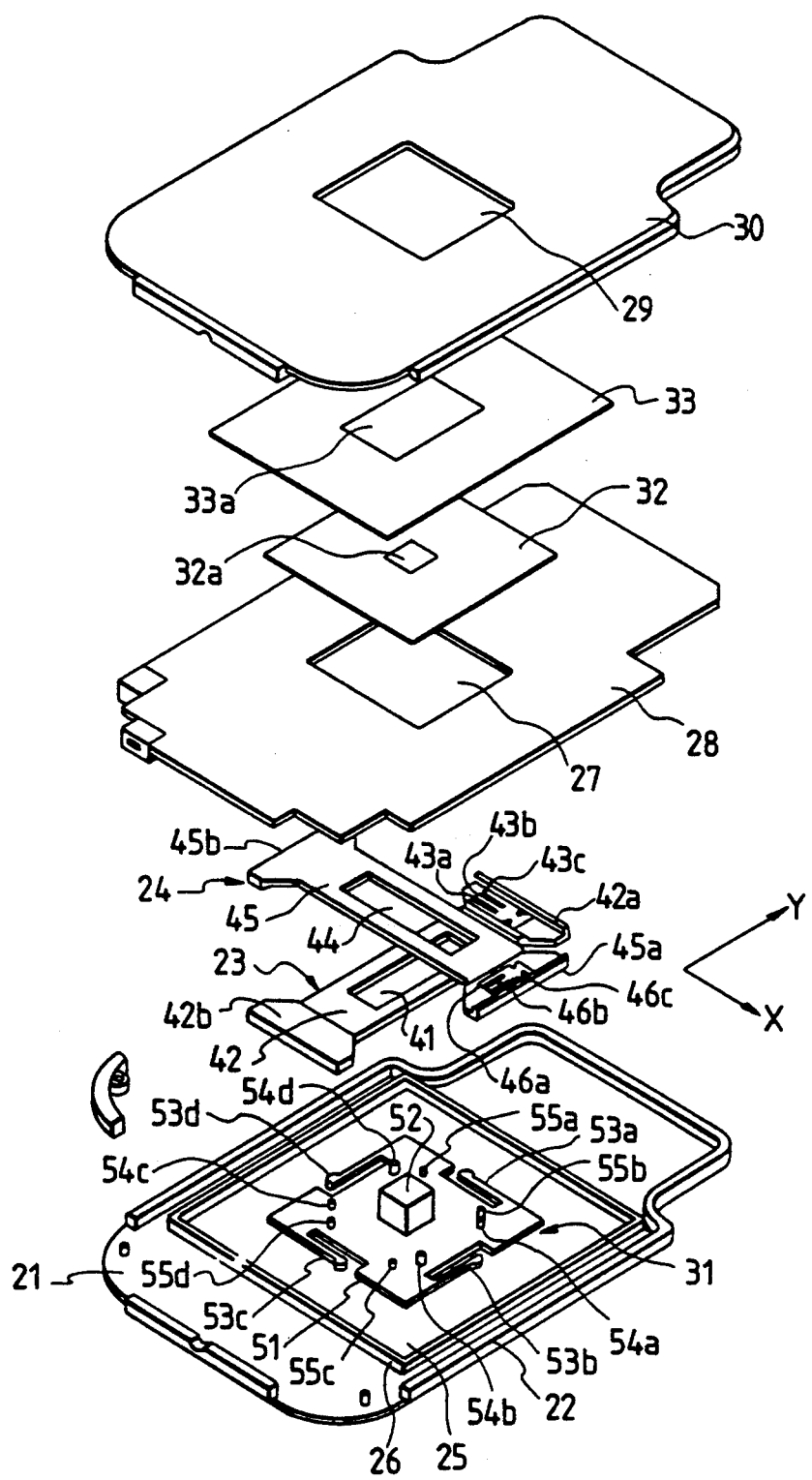
FIG. 1 is an exploded oblique view showing the first embodiment of an x-y direction input device of the present invention.
Figure 4:
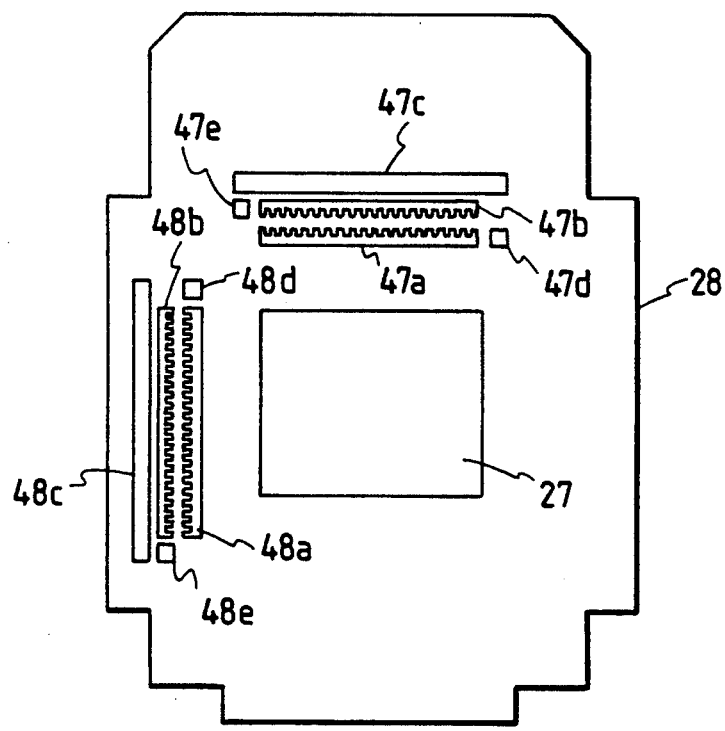
FIG. 4 is a back view of a substrate included in the x-y direction input device of FIG. 1.

FIG. 1 is an exploded oblique view showing the first embodiment of an x-y direction input device of the present invention. FIG. 2 is a cross-sectional view of a major portion for explaining a structure of an operating member included in the x-y direction input device of FIG. 1, wherein a substrate and masks are excluded. FIGS. 3(a), 3(b), and 3(c) are plan views of major portions for explaining the operations of elastic members included in the x-y direction input device of FIG. 1. FIG. 4 is a back view of a substrate included in the x-y direction input device of FIG. 1.

An x-y direction input device of this embodiment comprises: as shown in FIG. 1, a substantially rectangular base 21; an outer frame 22 placed on the base 21; a first moving member 23 movable in an x direction; that is, a lateral direction of the base 21; a second moving member 24 movable in a y direction; that is, a longitudinal direction of the base 21; a receiver surface 25 formed on the base 21, a rectangular inner frame 26 that fences the receiver surface 25 and is slightly longer in the x direction; a substrate 28 that has an aperture 27 whose long side in the x direction is shorter than the long side of the inner frame 26, and whose short side in the y direction is shorter than the short side of the inner frame 26, and is supported by the outer frame 22; a top plate 30 that has a rectangular aperture 29 opposed to the aperture 27 and is mounted on the outer frame 22; and masks 32 and 33 that are placed between the substrate 28 and top plate 30 and shield the aperture 29. The base 21, outer frame 22, and top plate 30 constitute a casing serving as an enclosure.

The foregoing first moving member 23 is made up of a proximal portion 42 extending in the y direction and having an elongated hole 41, and distal portions 42a and 42b lying across the proximal portion 42, and coming into contact with and sliding along the inner frame 26. In the distal portion 42a, a pair of detecting means, for example, sliders 43a to 43c are installed. The second moving member 24 is made up of, similarly, a proximal portion 45 extending in the x direction and having an elongated hole 44, and distal portions 45a and 45b lying across the proximal portion 45 and sliding along the inner frame 26. In the distal portion 45a, another pair of detecting means, for example, contact type sliders 46a to 46c are installed. The inner frame 26 and the distal portions 42a and 42b constitute a first guide means for guiding the first moving member in the x direction. The inner frame 26 and the distal portions 45a and 45b constitute a second guide means for guiding the second moving member 24 in the y direction.

On the back of the substrate 28, as shown in FIG. 4, an XA pattern 47a, an XB pattern 47b, and a common pattern 47c, with and along which the sliders 43a to 43c come into contact and slide, are extending in the x direction, and false pulse patterns 47d and 47e are formed at the ends of movement of the sliders 43a and 43b. Similarly, a YA pattern 48a, a YB pattern 48b, and another common pattern 48c, with and along which the sliders 46a to 46c come into contact and slide, are extending in the y direction, and false pulse patterns 48d and 48e are formed at the ends of movement of the sliders 46a and 46b.

The operating member 31 is, as shown in FIG. 2, made up of a square flat plate 51 (sliding section) sliding over the receiver surface 25, and a projection 52 of a quadrangular prism that is projecting from the flat plate 51, and inserted in the elongated hole 41 of the moving member 23 and the elongated hole 44 of the moving member 24, and one of whose ends is exposed from the aperture 29 of the top plate 30. The operating member 31 is made of a synthetic resin having elasticity. The edges of the flat plate 51 are formed as elastic members for pushing back the flat plate from ends of movement to the center, for example, elastic tongues 53a to 53d. The tips of the elastic tongues 53a to 53d can come into contact with the inner frame 26. On the top of the flat plate 51, two pairs of slide-contact members, for example, contact pins 55a to 55d are arranged to sandwich the first moving member 23, and to come into contact with and slide along both side faces of the moving member 23. Two pairs of slide-contact members, for example, contact pins 54a to 54d are arranged to sandwich the second moving member 24, and to come into contact with and slide along both side faces of the moving member 24.

The mask 32 is, as shown in FIG. 1, formed with a square thin plate, one of whose sides is slightly longer than the long side of the aperture 27, and has a square hole 32a, in which the projection 52 of the operating member 31 is inserted, in the center thereof. The other mask 33 is formed with a rectangular thin plate whose short side is slightly longer than one side of the mask 32, and whose long side is longer than the short side, and has an elongated hole 33a, in which the projection 52 of the operating member 31 is inserted, in the center thereof. These masks 32 and 33 are stacked sequentially on the substrate 28, movable independently of each other to cover the aperture 29.

In this embodiment, a cursor appearing on a display is moved to an arbitrary position by manually sliding the projection 52. Alternatively, the x-y direction input device may be placed upside down, such that the projection 52 contacts and is held against a stationary base (not shown). The projection 52 may then be moved relative to the outer frame 22 by moving; the outer frame 22. In this way, the first moving member 23 moves relatively along the x-direction patterns 47a to 47c on the substrate 28, and the second moving member 24 moves relatively along the y-direction patterns 48a to 48c. At this time, the sliders 43a to 43c come into contact with the XA pattern 47a, XB pattern 47b, and common pattern 47c, and then output x-direction A-phase and B-phase signals. In response to these signals, an x-direction cursor control signal is output to a display. Similarly, the sliders 46a to 46c come into contact with the YA pattern 48a, YB pattern 48B, and common pattern 48c, and then output y-direction A-phase and B-phase signals. Then, a y-direction cursor control signal is output to the display.

Then, the operating member 31 is moved from the center position shown in FIG. 3a until the tip of the elastic tongue 53d comes into contact with the inner frame 26 as shown in FIG. 3b. Thereafter, if the operating member 31 is moved to one end of movement in the x direction, as shown in FIG. 3c, the elastic tongue 53d elastically comes into contact with the inner frame 26. At this time, the slider 43a comes into contact with and slides along the false pulse pattern 47d, and outputs a false pulse control signal. Due to this false endless output, the cursor appearing on a display continues to move. Next, when the projection 52 is released, the elastic force of the elastic tongue 53d causes the operating member 31 to withdraw to a position shown in FIG. 3b, and the slider 43a parts from the false pulse pattern 47d to stop the output of a false pulse control signal. This is true for an operation of moving the operating member 31 to the other end of movement in the x direction or an operation of moving the operating member 31 to an end of movement in the y direction.

In this embodiment having the aforesaid construction, the axial pressing force applied to a projection 52 resulting from the pressing operation of the projection 52 of an operating member 31 is received by a receiver surface 25 of a base 21 via a flat plate 51. The axial pressing force will, therefore, not be applied to a first moving member 23 or a second moving member 24. This results in smooth movement of the moving members 23 and 24. In this embodiment, unlike a mouse, neither a ball nor a rotary encoder is required in order to move a cursor appearing on a display in any direction according to a magnitude of relative movement of the operating member 31. Because neither a ball nor a rotary encoder is required, the casing of the x-y input device is much thinner than mouse-type input devices. Furthermore, since elastic tongues 53a to 53d for pushing back the first and second moving members 23 and 24 from their ends of movement to the center are formed on the flat plate 51 of the operating member 31, even after the operating member reaches an end of movement, the movement or stop of a cursor can be controlled with excellent operability. Besides, the number of parts need not be increased. Moreover, since multiple masks 32 and 33, which are movable independently of each other, are included to shield an aperture 29 of a top plate 30, the masks 32 and 33 can be shaped relatively compactly. This realizes downsizing of the casing. Besides, since contact pins 55a to 55d on the flat plate 51 sandwich the first moving member 23, and contact pins 54a to 54d sandwich the second moving member 24, the middle portions of the moving members 23 and 24 can be guided and moved smoothly. Furthermore, the moving members 23 and 24 are held to cross mutually, so that backlash can be minimized. This results in an x-y direction input device providing excellent detecting precision and high resolution.

Figure 5:
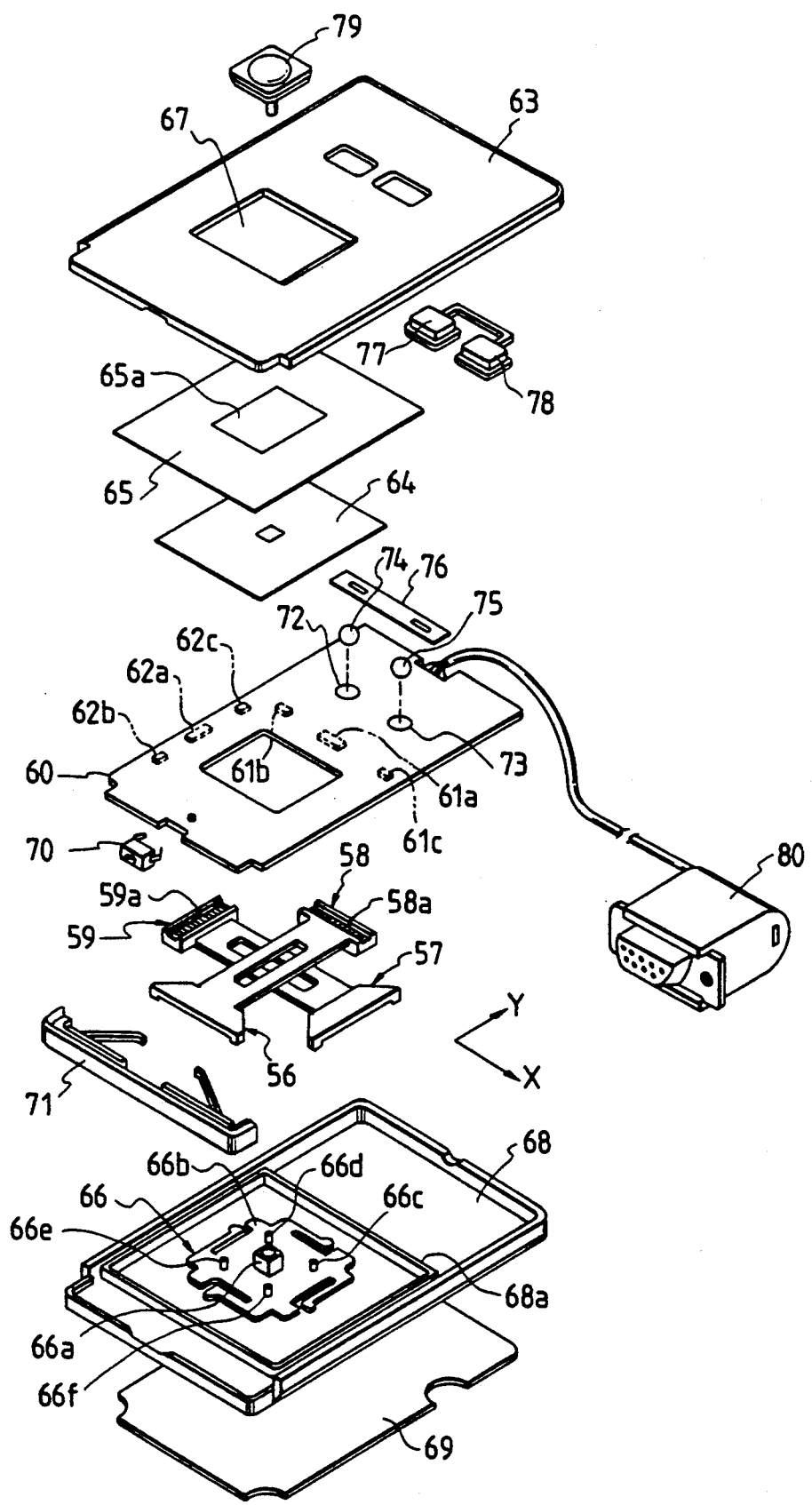
FIG. 5 is an exploded oblique view showing the second embodiment of an x-y direction input device of the present invention.
Figure 6:
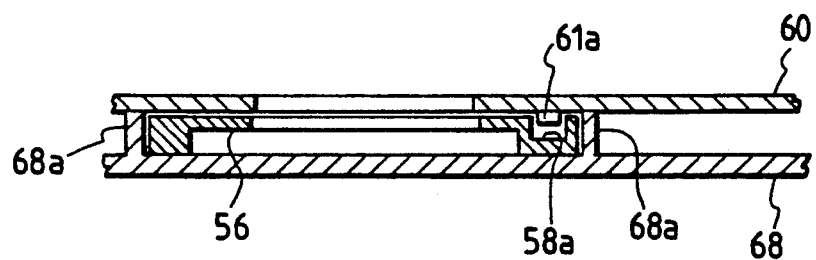
FIG. 6 is a cross-sectional view of a major portion showing the positional relationship between a detecting element and an element to be detected which are included in the x-y direction input device of FIG. 5.
Figure 7:
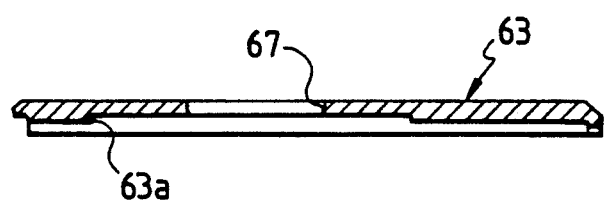
FIG. 7 is a cross-sectional view of a top plate included in the x-y direction input device of FIG. 5.

FIG. 5 is an exploded oblique view showing the second embodiment of an x-y direction input device of the present invention. FIG. 6 is a cross-sectional view of a major portion showing the positional relationship between a detecting element and an element to be detected, which are included in the x-y direction input device of FIG. 5, wherein a top plate and an operating member are excluded. FIG. 7 is a cross-sectional view showing the top plate included in the x-y direction input device of FIG. 5.

In the first embodiment, first and second moving members 23 and 24 are provided with contact type sliders 43a to 43c, and 46a to 46c serving as detecting means, and a substrate 28 is provided with patterns 47a to 47e, and 48a to 48e serving as means to be detected. By contrast, in an x-y direction input device of the second embodiment, as shown in FIG. 5, first and second moving members 56 and 57 are provided with an element to be detected 58 having an x-direction pattern 58a and an element to be detected 59 having a y-direction pattern 59a, and a substrate 60 is provided with detecting elements 61a to 61c, and 62a to 62c which are opposed to the patterns 58a and 59a respectively.

In the pattern 58a, reflecting areas and non-reflecting areas are arranged alternately along the x direction. In the pattern 59a, reflecting areas and non-reflecting areas are arranged alternately along the y direction. The detecting element 61a is realized with, for example, a reflection type photosensor (photo-reflector) made up of one light-emitting diode and two phototransistors, which are not shown. The detecting element 61a detects the pattern 58a and outputs x-direction A-phase and B-phase signals. The detecting element 62a has the same structure as the detecting element 61a. The detecting element 62a detects the pattern 59a and outputs y-direction A-phase and B-phase signals. Each of the detecting elements 61b and 61c is realized with, for example, a reflection type photosensor (photo-reflector) made up of one light-emitting diode and one phototransistor, which are not shown. Each of the detecting elements 61b and 61c detects an end of the pattern 58a, and outputs an x-direction limit signal. Each of the detecting elements 62b and 62c has the same structure as each of the detecting elements 61b and 61c. Each of the detecting elements 62b and 62c detects an end of the pattern 59a and outputs a y-direction limit signal.

As shown in FIG. 7, a step 63a is formed on the back of a top plate 63. The step 63a restricts the y-direction movement or rotation of an upper mask 65. Even when an operating member 66 for moving the first and second moving members 56 and 57 in the x and y directions independently of each other is moved, the mask 65 is guided not to tilt. A lower mask 64 is also held not to tilt because a projection 66a, which is projecting from the operating member 66 and exposed from an aperture 67 of the top plate 63, is inserted in a square hole in the center of the mask 64.

The masks 64 and 65 are thin plates, stacked sequentially on a substrate 60, and movable independently of each other. The lower mask 64 is designed so that when the operating member 66 reaches an end of movement, the x-direction end thereof will lie inside an x-direction margin of the aperture 67 of the top plate 63 of a casing, and the y-direction end thereof will lie slightly outside a y-direction margin of the aperture 67. The upper mask 65 has a window 65a that is longer in the y direction, and is shaped like a rectangle, which is longer in the y direction, so that when the operating member 66 reaches an end of movement, the upper mask 65 will shield that portion of the aperture 67 not screened by the lower mask 64.

The structure of each of the masks, and the structures of other major components are identical to those in the first embodiment. In FIG. 5, 68 denotes a base. 68a denotes a rectangular inner frame that is placed on the base 68 and longer in the x direction at the same ratio as the aperture 67. 69 denotes a rubber adhering to the bottom of the base 68. 70 denotes a switch mounted on one end of the substrate 60. 71 denotes a key top for pressing the switch 70. 72 and 73 are stationary contacts resting on the substrate 60. 74 and 75 are doom-shaped movable contacts disposed on the stationary contacts 72 and 73. 76 denotes a tape for holding the movable contacts 74 and 75. 77 and 78 are key tops for pressing the movable contacts 74 and 75 via the tape 76. 79 denotes a knob mounted on the top end of the projection 66a of the operating member 66. 80 denotes a connector linked to the substrate 60. The flat plate 66b of the operating member 66 is provided with slide-contact pins 66c to 66f arranged to sandwich the first and second moving members 56 and 57. These four slide-contact pins 66c to 66f are in contact with both side faces of the first moving member 56 and those of the second moving member 57.

In this second embodiment, a cursor appearing on a display may be moved in any direction in response to manipulation of the operating member 66. Alternatively, the x-y direction input device is placed upside down, bringing the knob 79 into contact with a stationary base (not shown). The knob may then be moved relative to the casing by manipulating the casing. Consequently, the x-direction pattern 58a moves relatively along the detecting elements 61a to 61c, and the y-direction pattern 59a moves relatively along the detecting elements 62a to 62c.

The second embodiment having the aforesaid construction provides the same advantages as the first embodiment. Furthermore, the second embodiment including reflection type photosensors can realize more extensive thinning than an embodiment including transmission type photosensors. The aperture 67 of the top plate 63 has a rectangular shape that is longer in the x direction, corresponding to the shape of a screen of a display. When operating the operating member 66 while viewing the screen, an operator will have good operation feelings without an unnatural feeling.

Figure 8:
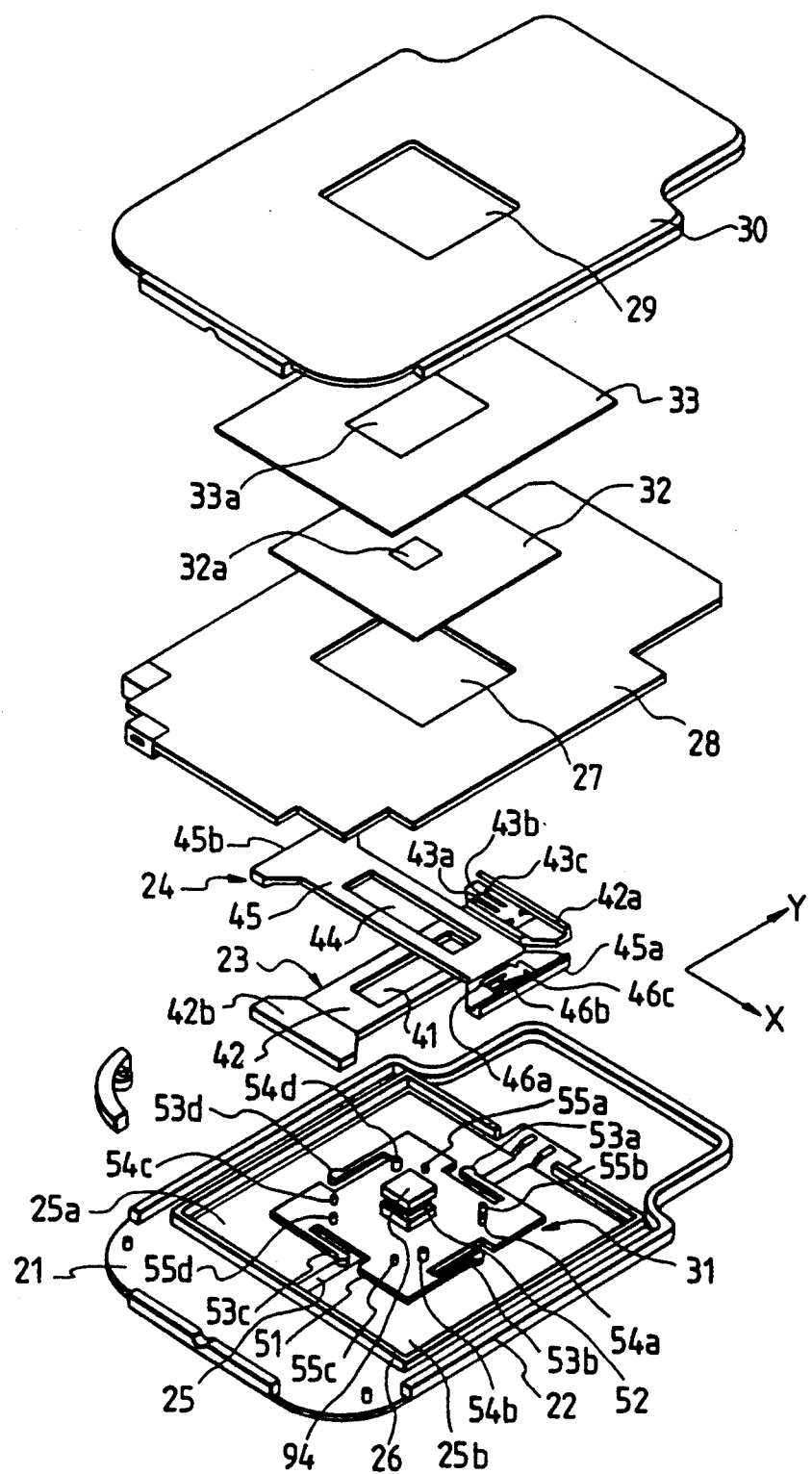
FIG. 8 is an exploded oblique view showing the third embodiment of an x-y direction input device of the present invention.
Figure 9:
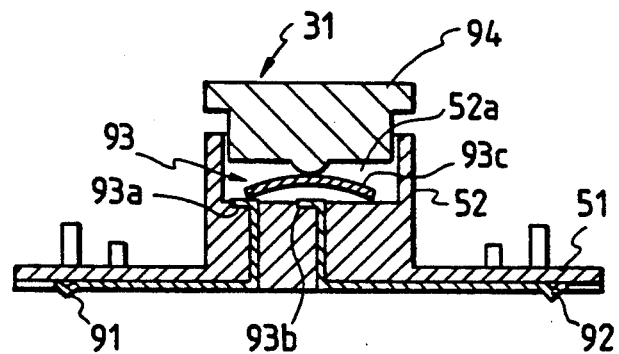
FIG. 9 is a cross-sectional view for explaining a structure of an operating member included in the x-y direction input device of FIG. 8.
Figure 10A:
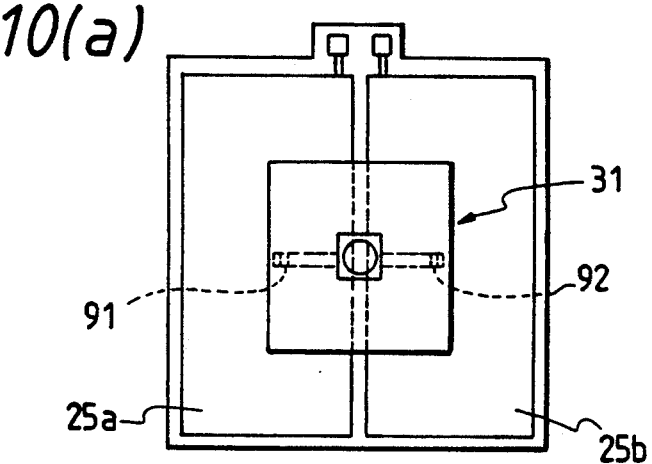
FIGS. 10(a) and 10(b) are partial plan views showing the positional relationship between an operating member and contact patterns included in the x-y direction input device of FIG. 8.
Figure 10B:
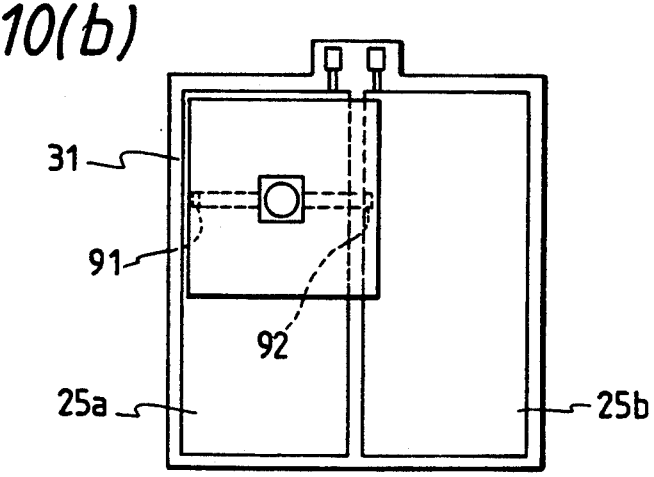
Figure 12:
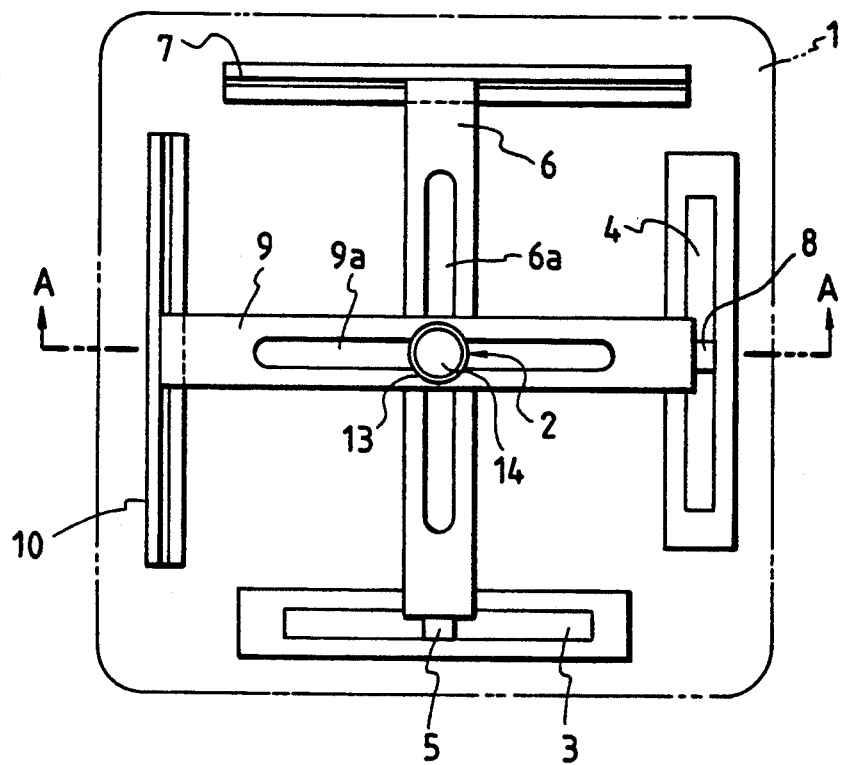
FIG. 12 is a plan view showing a conventional x-y direction input device.
Figure 13:
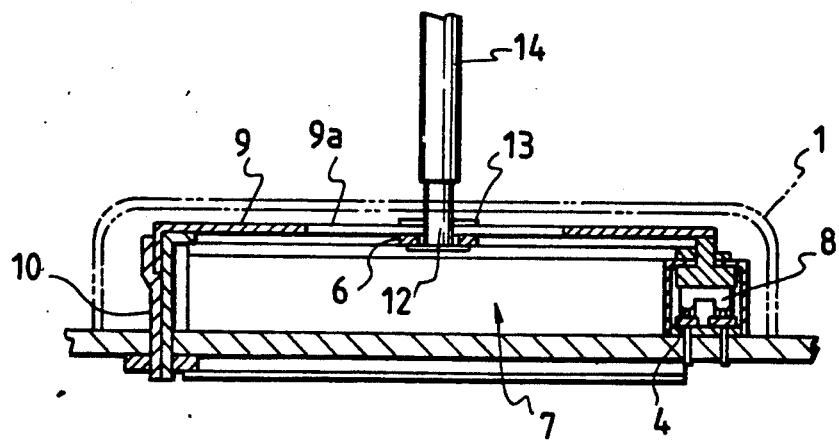
FIG. 13 is a cross-sectional view of the x-y direction input device taken along line 10—10 of FIG. 12.

FIG. 8 is an exploded oblique view showing the third embodiment of an x-y direction input device of the present invention. FIG. 9 is a cross-sectional view for explaining a structure of an operating member included in the x-y direction input device of FIG. 8. FIGS. 10(a) and 10(b) are plan views of major portions for explaining the positional relationship between an operating member and contact patterns included in the x-y direction input device of FIG. 8. A substrate including in the x-y direction input device of FIG. 8 is identical to that shown in FIG. 4 for the first embodiment, which, therefore, is not illustrated. Members identical to those in the first embodiment are assigned the same numerals. The duplicate description will be omitted.

Differences of the third embodiment from the first embodiment are that a pair of contact patterns 25a and 25b are formed on a receiver surface 25 on a base 21 fenced by an inner frame 26 and that an operating member 31 is provided with a switching means.

The operating member 31 in the third embodiment comprises, as shown in FIG. 9, a square flat plate 51 sliding over the contact patterns 25a and 25b, and a projection 52 of a quadrangular prism projecting from the flat plate 51 and inserted in an elongated hole 41 of a first moving member 23 and an elongated hole 44 of a second moving member 24. An aperture 52a is formed in the upper part of the projection 52. The operating member 31 is made of a synthetic resin having elasticity. The edges of the flat plate 51 are formed as elastic tongues 53a to 53d each of which comes into contact with the inner frame 26 and pushes back the operating member 31 from an end of movement to the center.

The operating member 31 includes, as shown in FIG. 9, a pair of contacts 91 and 92 which are always in contact with the contact patterns 25a and 25b over the moving range of the operating member 31, a switching means 93 connected to the contacts 91 and 92, and a pressing section 94 for switching the switching means 93. The contacts 91 and 92 are attached to the bottom of the flat plate 51. When the operating member 31 is positioned in the center of the moving range as shown in FIG. 10a, the contacts 91 and 92 are in contact with the contact patterns 25a and 25b respectively. The switching means 93 is located on the bottom of the aperture 52a and made up of a pair of stationary contacts 93a and 93b connected to the contacts 91 and 92 respectively, and a dome-shaped movable contact 93 formed with an elastic thin plate and placed in the aperture 52a. A margin of the movable contact 93c is always in contact with the stationary contact 93a, and the center thereof is brought into contact with the stationary contact 93b when the pressing section 94 is pressed. One end of the pressing section 94 can be inserted or extracted in or from the aperture 52a, and the other end thereof is exposed from an aperture 29 of a top plate 30.

In this embodiment, when a cursor appearing on a display is moved to any position, the pressing section 94 (projection 52) is pressed, for example, horizontally with a hand finger to slide the operating member 31. Thereby, the first moving member 23 moves relatively along x-direction patterns 47a to 47c on the substrate 28, and the second moving member 24 moves relatively along y-direction patterns 48a to 48c. The movement or stop of the cursor at this time is controlled in the same manner as that in the first embodiment.

Next, how to enter a menu selection command or an execution command after a cursor is moved to an intended position will be described. This entry can be achieved by pressing the pressing section 94 with a finger after sliding the operating member 31 (projection 52). Specifically, when the pressing section 94 of the operating member 31 is pressed down, the pressing section 94 pushes down the center of the movable contact 93c. This brings the center of the movable contact 93c into contact with the stationary contact 93b. Along with this, a circuit made up of the contact pattern 25a, contact 91, stationary contact 93a, movable contact 93c, stationary contact 93b, contact 92, and contact pattern 25b is closed. Thereafter, when the pressed state of the pressing section 94 is released, the movable contact 93c is reset to an original state due to elastic force, and the center of the movable contact 93 parts from the stationary contact 93b.

The third embodiment having the above construction provides the same advantages as the first embodiment. In this third embodiment, since an operating member 31 is provided with a pressing section 94 for switching the switching means, when the pressing section 94 is pressed, an operator can enter an execution command without parting a finger from the operating member 31.

In the aforesaid embodiments, an operating member 31 (66) is a united body of a flat plate 51 and a projection 52. The present invention is not limited to this structure. Alternatively, the flat plate and projection may be independent members. Then, the projection 52 is mounted on the flat plate 51, and thus the operating member 31 is configured. In short, the operating member 31 should merely include the flat plate 51 to which axial pressing force applied to the projection 52 during operation is transmitted.

In the first and third embodiments, a substrate 28 has both x-direction and y-direction patterns. Needless to say, a substrate having an x-direction pattern and a substrate having a y-direction pattern may be included independently of each other.

In the aforesaid embodiments, a mask 32 (64) of masks 32 and 33 (64 and 65) is arranged on a substrate 28 (60), and then the other mask 33 (65) is stacked on the mask 32 (64). The order of arranging these masks 32 and 33 (64 and 65) can be reversed. As for a combination of a detecting means and a means to be detected, except those adopted in the aforesaid embodiment, a combination of, for example, a transmission type photosensor (photo-interruptor) and a slitted plate may be employed. A magnetic photosensor is also usable.

Figure 11:
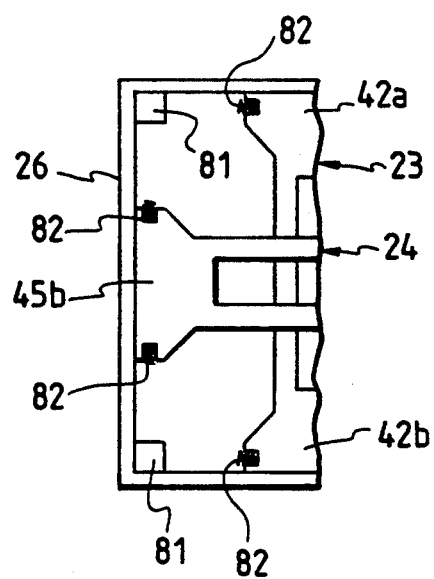
FIG. 11 is a plan view of a major portion showing a variant of elastic members included in the x-y direction input device of FIG. 1.

Furthermore, in the first embodiment, elastic tongues 53c to 53d, which are formed as part of a flat plate 51 of an operating member 31, serve as elastic members for pushing back moving members 23 and 24 from ends of movement. Instead of the elastic tongues 53c to 53d, as shown in FIG. 11, a contact corner 81 may be attached to respective corners of an inner frame 26. Then, the distal ends 42a and 42b of the moving member 23, and the distal ends 45a and 45b of the moving member 24 may be provided with coil springs that can come into contact with the contact corners 81. This is also true for those in the second and third embodiments.

In the aforesaid embodiments, an x-y direction input device is a unit like a mouse. The present invention is not limited to this mode, but apparently applicable to a mode in which an x-y direction input device is incorporated in a keyboard or a remote control.

Due to the aforesaid construction, the present invention can provide an x-y direction input device that can not only move a cursor appearing on a display in any direction according to movement of an operating member without requiring, unlike a mouse, a ball or a rotary encoder, but also move a pair of moving members holding detecting means or means to be detected smoothly, and that even after the operating member reaches an end of movement, permits excellent operability.

What is claimed is:

1. An x-y direction input device for controlling a cursor appearing on a display, said input device comprising:

a casing having a first surface;

an operating member having a lower surface and an upper surface, said lower surface being slidably disposed on the first surface, said operating member having a protrusion extending from the upper surface;

a first moving member having a first elongated body defining a first elongated opening, said first moving member being slidably connected to said casing wherein:

said protrusion extends through said first elongated opening, and said first elongated body extends in a first direction and is restrained to slide in a second direction perpendicular to said first direction;

a second moving member having a second elongated body defining a second elongated opening, said second moving member being slidably connected to said casing wherein;

said protrusion extends through said second elongated opening, said second elongated body extends in said second direction and is restrained to slide in said first direction, and said first moving member is located between said second moving member and said operating member;

means for detecting a first movement of said first moving member in said second direction and for generating a first movement signal in response to said first movement;

means for detecting a second movement of said second moving member in said first direction and for generating a second movement signal in response to said second movement;

a first end detector connected to said first moving member, said first end detector generating a first false pulse signal when said first moving member is disposed at an end of travel in said second direction;

a second end detector connected to said second moving member, said second end detector generating a second false pulse signal when said second moving member is disposed at an end of travel in said first direction; and a frame fixedly connected to said casing and surrounding said first surface;

wherein said operating member includes a plurality of resilient members disposed to contact said frame when said operating member is in a position wherein one or more of said first end detector and said second end detector is generating said first or second false pulse signals; and wherein said resilient members bias said operating member away from said frame.

2. An x-y direction input device according to claim 1 further comprising:

first and second guide members fixedly connected to said casing, said first guide member extending in said first direction and said second guide member extending in said second direction;

a first detection pattern formed on said casing adjacent said second guide member; and a second detection pattern formed on said casing adjacent said first guide member;

wherein a first end of said first moving member is slidably connected to said second guide member and a second end of said second moving member is slidably connected to said first guide member;

wherein a first detector is connected to said first moving member adjacent said first end, said first detector generating said first position signal in response to a detected portion of said first detection pattern; and wherein a second detector is connected to said second moving member adjacent said second end, said second detector generating said second position signal in response to a detected portion of said second detection pattern.

3. An x-y direction input device according to claim 1 further comprising:

first and second guide members fixedly connected to said casing, said first guide member extending in said first direction and said second guide member extending in said second direction;

a first detector connected to said casing adjacent said second guide member; and a second detector connected to said casing adjacent said first guide member;

wherein a first end of said first moving member is slidably connected to said second guide member and a second end of said second moving member is slidably connected to said first guide member;

wherein a first detection pattern is formed on said first moving member adjacent said first end, said first detector generating said first position signal in response to a detected portion of said first detection pattern; and wherein a second detection pattern is formed on said second moving member adjacent said second end, said second detector generating said second position signal in response to a detected portion of said second detection pattern.

4. An x-y direction input device according to claim 1, wherein said resilient members are integral with said operating member.

5. An x-y direction input device according to claim 1 further comprising a switch connected to said operating member for generating a menu selection command signal when said switch is manually actuated by an operator.

6. An x-y direction input device for controlling a cursor appearing on a display, said input device comprising:

a casing having a first surface and a frame surrounding said first surface, said frame including first and second parallel legs extending in a first direction and third and fourth parallel legs extending in a second direction, said second direction being perpendicular to said first direction;

an operating member having a lower surface and an upper surface, said lower surface being slidably disposed on the first surface within said frame, said operating member having a protrusion extending from the upper surface;

a first moving member having a first elongated body defining a first elongated opening, said first elongated body extending in said first direction and being slidably connected to said third and fourth legs, said protrusion extending through said first elongated opening;

a second moving member having a second elongated body defining a second elongated opening, said second elongated body extending in said second direction and being slidably connected to said first and second legs, said protrusion extending through said second elongated opening;

means for detecting a first movement of said first moving member in said second direction and for generating a first movement signal in response to said first movement;

means for detecting a second movement of said second moving member in said first direction and for generating a second movement signal in response to said second movement;

a first end detector connected to said first moving member, said first end detector generating a first false pulse signal when said first moving member contacts one of said first and second legs;

a second end detector connected to said second moving member, said second end detector generating a second false pulse signal when said second moving member contacts one of said third or fourth legs; and wherein said operating member includes a plurality of resilient members disposed to contact said frame when said operating member is in a position wherein one or more of said first and second moving members contacts said frame, said resilient members biasing said operating member away from said frame such that said first and second moving members are biased away from said first and second end detectors.

7. An x-y direction input device according to claim 6, wherein said resilient members are integral with said operating member.

8. An x-y direction input device according to claim 6, further comprising a switch connected to said operating member for generating a menu selection command signal when said switch is manually actuated by an operator.

9. An x-y direction input device for controlling a cursor appearing on a display, said input device comprising:
- a casing having a first surface;
- an operating member having a lower surface and an upper surface, said lower surface being slidably disposed on the first surface, said operating member having a protrusion extending from the upper surface;
- a first moving member having a first elongated body defining a first elongated opening, said first moving member being slidably connected to said casing wherein:
  - said protrusion extends through said first elongated opening, and
  - said first elongated body extends in a first direction and is restrained to slide in a second direction perpendicular to said first direction;
- a second moving member having a second elongated body defining a second elongated opening, said second moving member being slidably connected to said casing wherein:
  - said protrusion extends through said second elongated opening,
  - said second elongated body extends in said second direction and is restrained to slide in said first direction, and
  - said first moving member is located between said second moving member and said operating member;
- means for detecting a first movement of said first moving member in said second direction and for generating a first movement signal in response to said first movement;
- means for detecting a second movement of said second moving member in said first direction and for generating a second movement signal in response to said second movement;
- a first end detector connected connected to said first moving member, said first end detector generating a first false pulse signal when said first moving member is disposed at an end of travel in said second direction;
- a second end detector connected to said second moving member, said second end detector generating a second false pulse signal when said second moving member is disposed at an end travel in said first direction; and
- a frame fixedly connected to said casing and surrounding said first surface;
- wherein each of said first and second moving members includes a plurality of resilient members disposed to contact said frame when said operating member is in a position wherein one or more of said first end detector and said second end detector is generating said first or second false pulse signals; and
- wherein said resilient members bias said first and second moving members away from said frame.

10. An x-y direction input device according to claim 9 further comprising:
- first and second guide members fixedly connected to said casing, said first guide member extending in said first direction and said second guide member extending in said second direction;
- a first direction pattern formed on said casing adjacent said second guide member; and
- a second detection pattern formed on said casing adjacent said first guide member;
- wherein a first end of said first moving member is slidably connected to said guide member and a second end of said second moving member is slidably connected to said first guide member;
- wherein a first detector is connected to said first moving member adjacent said first end, said first detector generating said first position signal in response to a detected portion of said first detection pattern; and
- wherein said detector is connected to said second moving member adjacent said second end, said second detector generating said second position signal in response to a detected portion of said second detection pattern.

11. An x-y direction input device according to claim 9 further comprising:
- first and second guide members fixedly connected to said casing, said guide member extending in said first direction and said second guide member extending in said second direction;
- a first detector connected to said casing adjacent said second guide member; and
- a second detector connected to said casing adjacent said first guide member;
- wherein a first end of said first moving member is slidably connected to said second guide member and a second end of said second moving member is slidably connected to said first guide member;
- wherein a first detection pattern is formed on said first moving member adjacent said first end, said first detector generating said first position signal in response to a detected portion of said first detection pattern; and
- wherein a second detection pattern is formed on said second moving member adjacent said second end, said second detector generating said second position signal in response to a detected portion of said detection pattern.

12. An x-y direction input device according to claim 9 further comprising a switch connected to said operating member for generating a menu selection command signal when said switch is manually actuated by an operator.

* * * * *